United States Patent [19]

LaPinta et al.

[11] Patent Number: 5,168,277
[45] Date of Patent: Dec. 1, 1992

[54] RADAR TRACKING SYSTEM HAVING TARGET POSITION DEAD RECKONING

[75] Inventors: Leonard T. LaPinta, Shelton; J. David Epler, Bethany; John F. Gambardella, North Haven, all of Conn.

[73] Assignee: United Technologies Corporation, Hartford, Conn.

[21] Appl. No.: 797,654

[22] Filed: Nov. 25, 1991

[51] Int. Cl.[5] .............................................. G01S 13/66
[52] U.S. Cl. ...................................... 342/77; 342/62; 342/63
[58] Field of Search .................... 342/62, 63, 77, 161, 342/195

[56] References Cited

U.S. PATENT DOCUMENTS

| | | | |
|---|---|---|---|
| 4,758,840 | 7/1988 | Dardenne et al. | 342/77 X |
| 4,806,934 | 2/1989 | Magoon | 342/103 |
| 4,837,576 | 6/1989 | Schwarz | 342/77 |
| 4,855,932 | 8/1989 | Cangiani et al. | 342/77 X |
| 4,975,705 | 12/1990 | Gellekink et al. | 342/77 X |

Primary Examiner—John B. Sotomayor
Attorney, Agent, or Firm—Michael Grillo

[57] ABSTRACT

A vehicle mounted radar tracking system monitors vehicle heading rate, vehicle heading acceleration, vehicle roll rate and vehicle pitch rate, and provides a turn detect signal in response to heading rate, heading acceleration, roll rate or pitch rate being in excess of corresponding enable threshold magnitudes. In response to the turn detect signal, the tracking system dead reckons the positions of targets being tacked, and tracking system parameters are varied to make it more responsive to target motion. The turn detect signal is removed in response to heading rate, heading acceleration, roll rate and pitch rate being less than corresponding disable threshold magnitudes, and the tracking system is returned to normal operation.

12 Claims, 6 Drawing Sheets

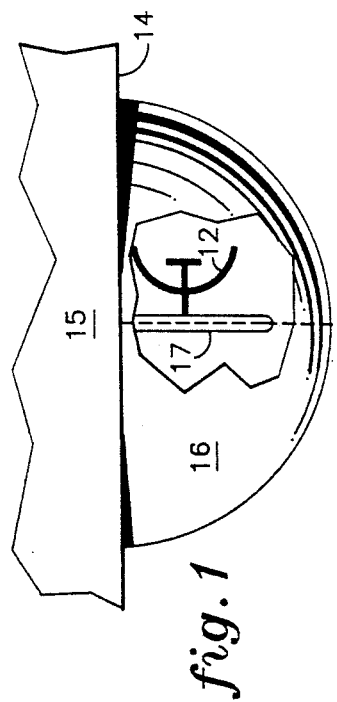
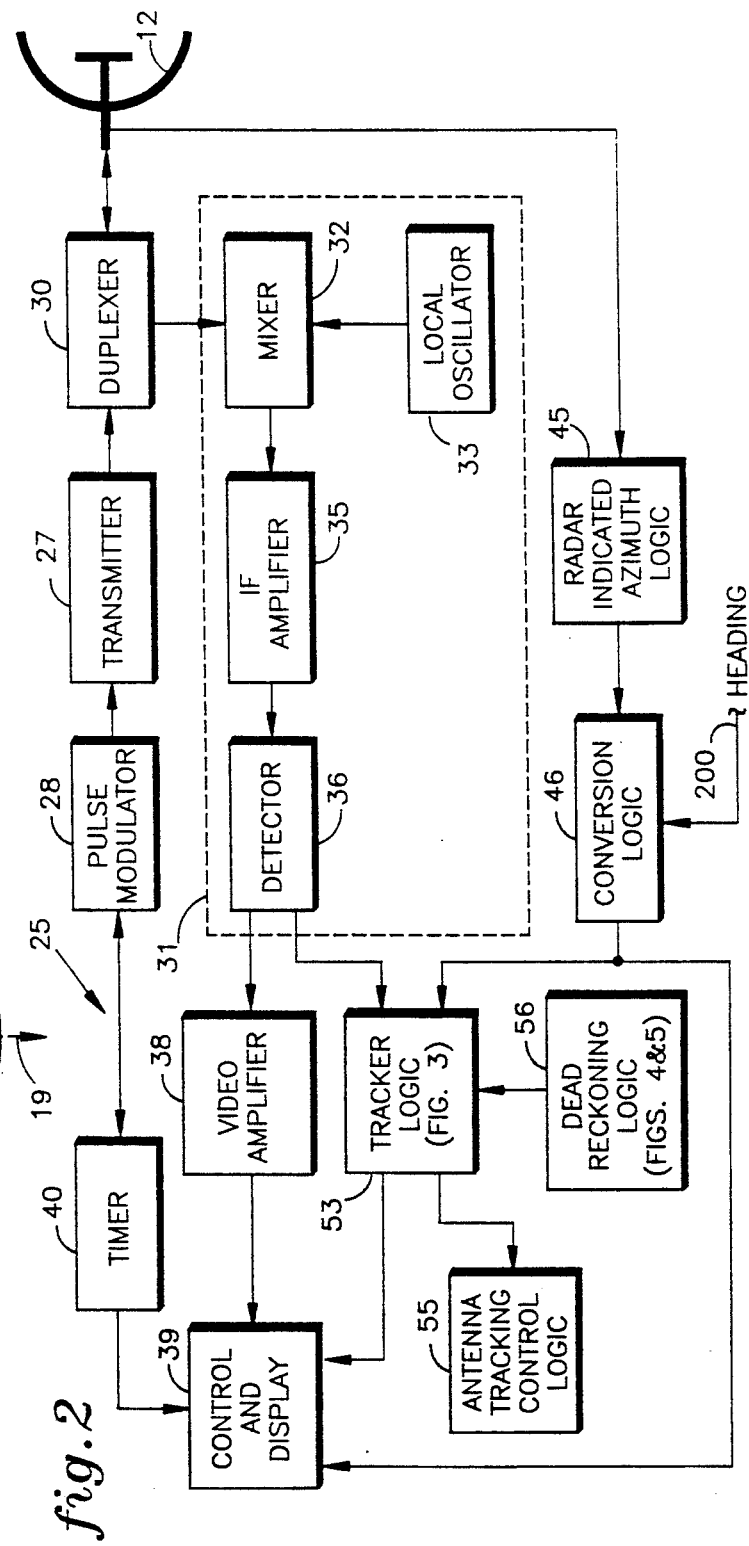
fig.1
fig.2

RADAR TRACKING SYSTEM HAVING TARGET POSITION DEAD RECKONING

DESCRIPTION

Technical Field

The present invention relates to vehicle mounted radar tracking systems and more particularly to providing target track information during changes in vehicle heading and during roll and/or pitch of a radar system antenna with respect to a reference.

BACKGROUND OF THE INVENTION

Radar systems are typically provided with a mechanical stabilization system for controlling the angular position of a radar antenna to thereby maintain a constant reference frame for the antenna with respect to a reference axis or plane, e.g., ground. Such mechanical stabilization is usually accomplished using servomechanisms, e.g., gimbal and drive systems. There are three types of vehicle motion that can affect the angular position of the radar antenna: roll, pitch and yaw. Roll is the side-to-side angular motion about a longitudinal, i.e., fore and aft, axis of the vehicle. Pitch is the alternating motion about an axis perpendicular to the longitudinal axis of the vehicle. Yaw is the motion of the vehicle about the vehicle's vertical axis. Position or rate gyros are typically used to sense vehicle pitch and roll, and issue position signals directly to the stabilization system to maintain the desired antenna reference.

A problem with using gimbal and drive systems for mechanical antenna stabilization is that they add significant weight to the radar system, which is of particular concern in radars intended for use on aircraft. Additionally, because of complexities associated with stabilization systems, they are prone to frequent repair and maintenance. Another problem is that servomechanisms required for roll and pitch stabilization increase the overall size of an antenna assembly with the result that within a given installation space, the area for the radiating portion of the antenna, and consequently the antenna gain and resolution, must be reduced.

A radar antenna that is rotational only about a vertical or yaw axis and not provided with roll and pitch stabilization, i.e., having a fixed platform, is referred to as being "strapped down". A strapped down antenna eliminates weight penalties and complexities associated with mechanical stabilization systems, and also reduces the space requirement for a given antenna. However, any roll and pitch experienced by a vehicle carrying the antenna is translated directly to the antenna. Movement of the antenna in roll and pitch may look to the radar system like movement of the target, and therefore, fixed platform antennas are incapable of providing accurate target position information during roll and/or pitch of the antenna, thereby preventing the radar tracking system from maintaining target tracking and correlation accuracy during antenna roll and/or pitch.

For example, if a strapped down radar is mounted on an aircraft which is located at an altitude of 1,000 feet, and is tracking an object 10 nautical miles away, a target bearing 45° relative to the aircraft will have a radar indicated azimuth of 45° relative during level flight. However, if the aircraft is in a roll angle of 10°, and therefore the radar antenna is at a 10° roll angle with respect to the reference axis, the indicated azimuth will be 44.4° relative. Similarly, if the aircraft is at a 10° pitch angle, the indicated azimuth will be 45.6° relative. The difference between the radar indicated azimuth and the actual azimuth increases with increased roll angle and pitch angle so that, for example, at a roll angle of 25°, the indicated azimuth will be 41.9° for a target with an actual azimuth of 45° relative.

The azimuth error suffered by radars which are not roll and pitch stabilized manifests itself as a "blurred" or "smeared" representation of the target on a radar display. Additionally, when roll or pitch movement of the radar antenna is rapid or of a large magnitude, the target may "jump" on the display. The azimuth error will also result in errors in the indicated target track position and velocity as provided by a radar tracking system. The tracking system position and velocity errors degrade the system's ability to maintain target track and correlation.

Typically, in a radar system used for target tracking, target position information is displayed as true azimuth rather than relative to the heading of the vehicle. In vehicles that experience rapid heading changes, e.g., aircraft, this may result in additional azimuth error. For example, if an aircraft is in a rapid or high speed turn, any delay or inaccuracy in the aircraft heading information provided to the tracking system will generate errors in target track information during the conversion from relative azimuth to true azimuth. These error in aircraft heading information typically result from delayed response of platform sensors to changes in aircraft heading, e.g., delayed response of heading rate gyros to rapid changes in aircraft heading. This azimuth error further degrades the tracking system's ability to maintain target acquisition and correlation.

DISCLOSURE OF INVENTION

Objects of the present invention include provision of improved target acquisition and correlation during changes in vehicle heading and during roll and/or pitch of a radar system antenna with respect to a reference.

According to the present invention, a vehicle mounted radar tracking system monitors the rate of change of vehicle heading (heading rate), the rate of change of heading rate (heading acceleration), vehicle roll rate and vehicle pitch rate; a turn detect signal is provided in response to heading rate, heading acceleration, roll rate or pitch rate being in excess of corresponding enable threshold magnitudes; in response to the turn detect signal, the tracking system dead reckons the positions of targets being tracked, and tracking system parameters are varied to make the tracking system more responsive to radar indicated target motion by reducing the time constant of the tracking system while the turn detect signal is being provided; the turn detect signal is removed in response to heading rate, heading acceleration, roll rate and pitch rate each being less than corresponding disable threshold magnitudes; and upon removal of the turn detect signal, the tracking system is returned to normal operation.

In further accord with the present invention, once the heading rate, heading acceleration, roll rate and pitch rate are below corresponding threshold magnitudes, the turn detect signal is maintained for a delay period to allow the tracking system to refine target solutions.

In still further accord with the present invention, the turn detect signal is removed after a fixed period even if heading rate, heading acceleration, roll rate or pitch rate are above their corresponding threshold magnitudes.

In a radar tracking system having an antenna which is not roll or pitch stabilized, the present invention provides an indication of dead reckoned target track during roll and/or pitch of the antenna with respect to a reference. The invention further provides an indication of dead reckoned target track during rapid changes in the heading of a vehicle carrying the radar. Therefore, the system continues to provide an indication of target position based on previous target position and velocity even though radar target position information is inaccurate. Additionally, the present invention increases the responsiveness of the tracking system by reducing the time constant of the tracking system during rapid vehicle heading changes and during antenna roll and/or pitch, thereby rapidly updating the tracker generated target solution. When the vehicle is no longer experiencing roll, pitch or heading change, the system continues to display the dead reckoned target position for a delay period to allow refinement of the tracker generated target solution. However, target position dead reckoning is disabled after a fixed or maximum period to prevent an actual target maneuver from going undetected, unless the target is being dead reckoned during a delay period which indicates that the maneuver has ended.

The invention may be implemented in a variety of ways including microprocessor software operating upon digital signals, or other alternative methods obvious to one skilled in the art, including, but not limited to, combinations of digital hardware, analog circuitry, etc. The invention is easily implemented using apparatus and techniques which are well known within the skill of the art in light of the specific teachings with respect thereto which follow hereinafter.

Other objects, features and advantage of the present invention will become more apparent in light of the following detailed description of exemplary embodiments thereof as illustrated in the accompanying drawings.

BRIEF DESCRIPTION OF DRAWINGS

FIG. 1 is a perspective view, partially broken away, of a radar antenna, which is not roll or pitch stabilized, mounted to the bottom of an aircraft;

FIG. 2 is a simplified schematic block diagram of a radar system;

BEST MODE FOR CARRYING OUT THE INVENTION

Figure 3:
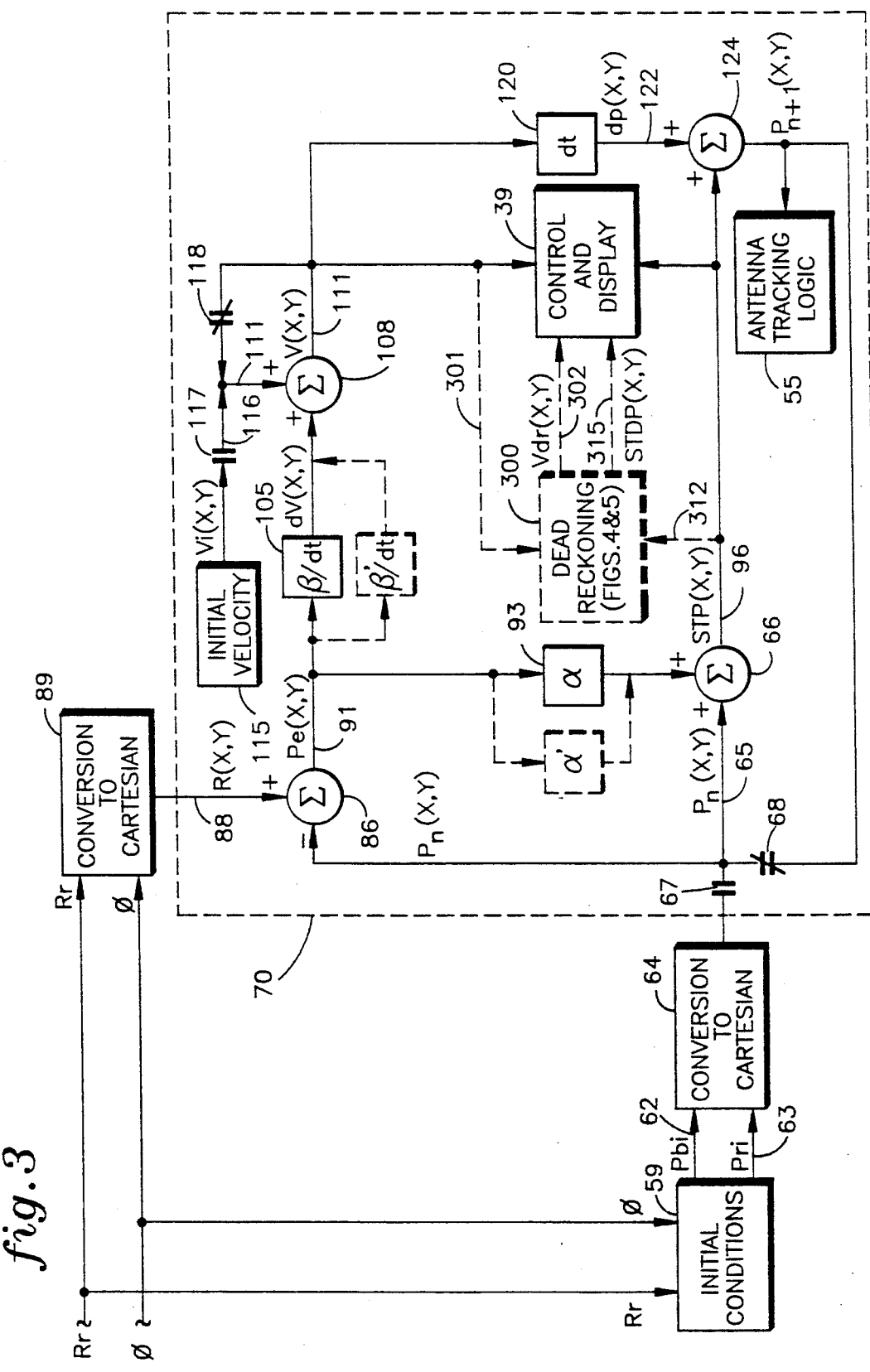
FIG. 3 is a simplified schematic block diagram of a radar tracking system utilizing target dead reckoning of the present invention.

The present invention is particularly well suited for use in a vehicle mounted radar tracking system to provide target track information during changes in vehicle heading and during roll and/or pitch of a radar system antenna with respect to a reference axis. Referring to FIG. 1, a radar antenna 12 is mounted on the underside 14 of a vehicle 15, e.g., an aircraft, and is covered by a protective shield or dome 16 to protect the antenna from damage. The antenna 12 is mounted for rotation on a shaft 17 about an axis 19. The antenna of FIG. 1 is of the type which is particularly useful for surface searching and tracking of surface targets. For purposes of describing the present invention, the antenna of FIG. 1 is illustrated as being "strapped down" to the aircraft frame 14 with the result that any roll or pitch of the aircraft is transmitted to the antenna. However, the invention will work equally well with an antenna of a type comprising servomechanisms which attempts to maintain the angular position of the antenna with respect to the reference axis 19.

Referring to FIG. 2, a simplified radar system 25 comprises a transmitter 27, e.g., an rf oscillator, that is pulsed, i.e. turned on and off, by a pulse modulator 28. The waveform generated by the transmitter 27 is provided via a duplexer 30 to the antenna 12, where it is radiated into space. The antenna is used for both transmitting and receiving. A receiver section 31 of the system must be protected from damage caused by the high power of the transmitter, and therefore, the duplexer 30 is provided to both protect the receiver from the high power transmitter signal and to channel the return echo signal to the receiver section 31.

The received signal is provided from the duplexer 30 to a mixer 32 which uses a local oscillator 33 to convert the received RF signal to an intermediate frequency (IF) signal. The IF signal is provided via an IF amplifier 35 to a detector 36 which extracts the pulse modulation from the IF signal. The output of the detector 36 is amplified by a video amplifier 38 to a level where it can be properly displayed on a control and display unit (CDU) 39, e.g., a cathode-ray tube (CRT) display. A timer 40 may be provided to supply timing signals to the display to provide a zero reference range.

Angle information is obtained from the pointing direction of the antenna 12 as indicated by a radar indicated azimuth logic portion 45 of the system 25. The angle information may be provided in any suitable way known in the art for converting mechanical radar antenna position information into a corresponding digital or analog signal, e.g. position sensors. The angle information supplied by the azimuth logic 45 is relative to the vehicle, typically with the front or nose of the vehicle selected as an arbitrary reference or 0° location. Thereafter, the angle information is supplied to conversion logic 46 which converts the angle to true azimuth using the heading of the vehicle as supplied for example by a heading gyroscope (not shown). Typically, the display is intensity-modulated wherein the amplitude of the receiver output determines the corresponding intensity of a target indicated on the display. The angular position of the target is determined as described hereinabove with respect to the antenna position provided by the azimuth logic 45 and conversion logic 46 of the system.

All of the apparatus described thus far is simply exemplary of that which is well known in the art.

The radar system of FIG. 2 is also provided with a tracker logic portion 53 which provides target track information to the CDU 39, and provides a predicted target position to antenna tracking control logic 55 so that multiple targets may be independently identified and tracked based on predicted target track as described in greater detail hereinafter. During level flight of the aircraft, the radar indicated target azimuth will be equal to the true target azimuth. However, as described hereinbefore, during angular movement of the antenna 12 with respect to the reference axis 19, the radar indicated target azimuth may be different from the true target azimuth. Additionally, during rapid vehicle heading changes, errors in target azimuth may develop when converting from relative to true bearings because of heading rate gyro delays in responding to changes in vehicle heading. Therefore, in accordance with the present invention, the system is provided with dead reckoning logic 56 for providing target track information and for varying tracker logic parameters during changes in vehicle heading and during roll and/or pitch of the antenna with respect to the reference axis 19, as described in greater detail hereinafter.

Referring to FIG. 3, a simplified alpha-beta target tracking system is shown. When a target is initially designated for tracking, initial target parameters are established in an initial conditions portion 59 of the tracking system wherein an initial predicted target bearing signal (Pbi) is set equal to radar indicated target azimuth ($\phi$), and an initial predicted target range signal (Pri) is set equal to the radar indicated target range (Rr). Pbi and Pri are provided on lines 62 and 63 respectively to a conversion portion 64 of the tracking system and converted from polar coordinates to cartesian coordinates using apparatus and techniques which are well known within the skill of the art, to thereby provide a pair of predicted target position signals, $P_n(x)$ and $P_n(y)$, which are shown as one signal $P_n(x,y)$ on a line 65 to a summing junction 66. $P_n(x,y)$ is provided by the initial conditions portion 59 via the conversion portion 64 and via normally open contact 67 when a target is initially designated for tracking. Thereafter $P_n(x,y)$ is provided via normally closed contact 68. For simplicity, all of the apparatus within the dashed line 70 is shown as singular, as for x or for y; however, each function is performed separately for x and for y. Hereinafter, it will be understood that signals shown as (x,y) actually represent two separate signals, one for x and another for y.

$P_n(x,y)$ is also provided on the line 65 to a summing junction 86. The other input to the summing junction 86 is a radar indicated target position signal R(x,y) on a line 88 which is provided by converting $\phi$ and Rr from polar to cartesian coordinates in a conversion portion 89 of the tracking system.

The output of the summing junction 86 is a predicted position error signal Pe(x,y) on a line 91 which is indicative of the difference between R(x,y) and $P_n(x,y)$. Pe(x,y) is applied to a multiplier 93 which multiplies the error signal by a first constant ($\alpha$). The output of the multipliers 93 is applied to the summing junction 66 where it is summed with $P_n(x,y)$ to provide a smoothed target position signal STP(x,y) on a line 96. STP(x,y) is a target position signal that is corrected for any errors identified by the tracking system, and represents the most accurate position signal for the tracked target. STP(x,y) is provided to the CDU 39 to provide the indicated position of the target being tracked on the CDU.

Pe(x,y) is also applied to a multiplier 105 which multiplies the error signal by a second constant $\beta/\delta t$ the output of which is change in velocity signal $\delta V(x,y)$ on a line 106. $\beta$ is a constant, and $\delta t$ is indicative of the the antenna scan rate, i.e., the time it takes the antenna to make a complete revolution. Therefore, $\delta V(x,y)$ is indicative of the incremental change in target velocity during the period $\delta t$ associated with the error in predicted target position Pe(x,y). $\delta V(x,y)$ is applied to a summing junction 108 where it is summed with a velocity signal V(x,y) on a line 111. Initially, the velocity signal is supplied by an initial velocity portion 115 of the tracking system which supplies an initial velocity signal Vi(x,y) on a line 116 via normally open contacts 117. Vi(x,y) may be a fixed velocity input based on the type of target being tracked or may be an instantaneous velocity calculation based on the the change in position of the target during a single scan period. Vi(x,y) is only provided when a target is initially designated for tracking, and thereafter, V(x,y) is provided in a feedback loop to the summing junction 108 via normally closed contacts 118.

The output of the summing junction 108 is V(x,y) on the line 111, which thereafter is provided to the CDU as an indication of the target velocity. As is known in the art, the target velocity may be displayed on the same display as the target position, or on a separate display. V(x,y) is also applied to a multiplier 120 which multiplies V(x,y) by the scan period $\delta t$. The output of the multiplier is a change in predicted position signal $\delta P(x,y)$ which is indicative of the change in target position during the scan period $\delta t$ for a target moving at a velocity equal to V(x,y). $\delta P(x,y)$ is provided on a line 122 to a summing junction 124 where it is summed with STP(x,y) on the line 96. The output of the summing junction 124 is a predicted target position signal $P_{n+1}(x,y)$ indicative of the predicted target azimuth where the tracker expects to display the target during the next time that the target is scanned by the radar antenna, i.e., the predicted target azimuth after the period $\delta t$.

$P_{n+1}(x,y)$ is provided to the antenna tracking control logic 55 where it is used to create a "window" of azimuth and range where the target is expected to be located during the next antenna sweep of the target. The window may be of fixed parameters based on predicted target position and velocity, or it may become smaller as target positioning information becomes more accurate with further sweeps of the radar antenna. This information is particularly useful for target correlation purposes when the tracker is tracking multiple targets.

The tracking system described hereinabove is of a type that is well known to the art for tracking radar contacts or targets. During rapid vehicle heading changes and during roll and/or pitch of the radar antenna with respect to its reference axis, the information supplied by the tracking system to the CDU 39 and the antenna tracking control logic 55 may be inaccurate and not indicative of true target track. Therefore, during rapid heading change and during antenna roll and/or pitch, the system of FIGS. 4 and 5 is used to modify the tracking system of FIG. 3 to minimize the effects of target azimuth error on the displayed target track.

Figure 4:
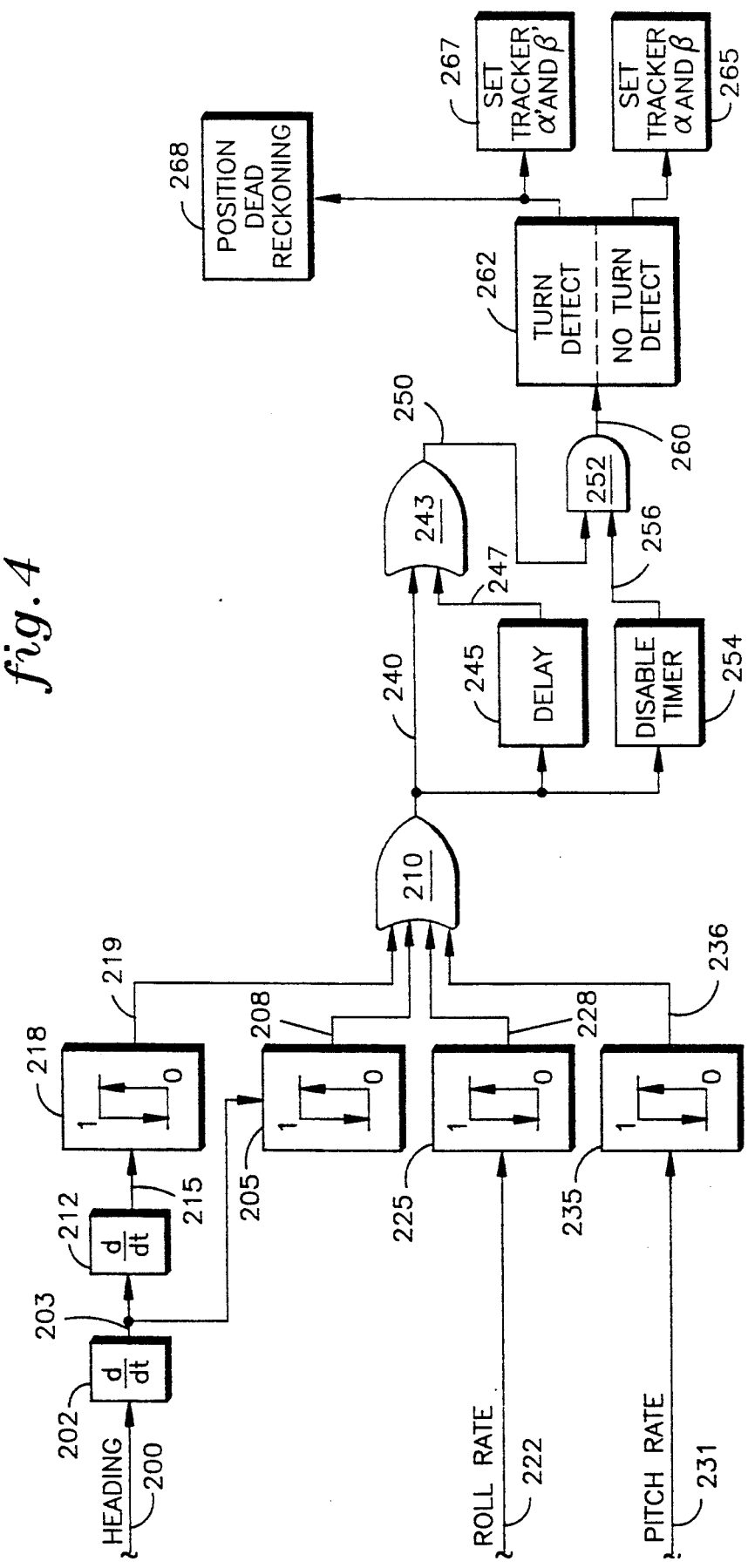
FIG. 4 is a simplified schematic block diagram of a system for determining when to implement target dead reckoning in accordance with the present invention.
Figure 5:
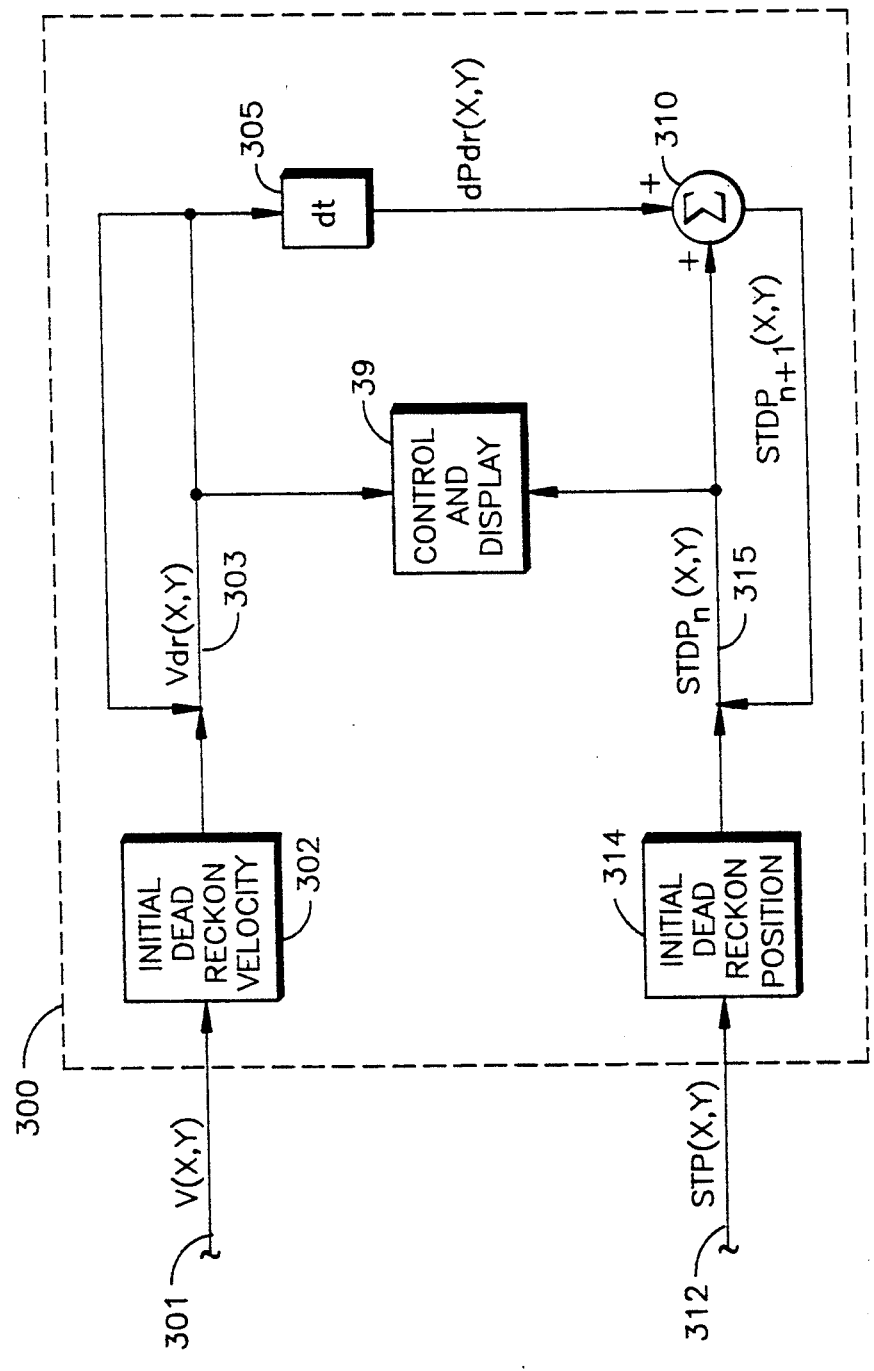
FIG. 5 is a simplified schematic block diagram of a dead reckoning portion of the radar tracking system of FIG. 3.

Referring to FIG. 4, a vehicle heading signal, provided for example by a heading gyroscope, is provided on a line 200 to a differentiator 202, the output of which is a heading rate signal on a line 203. The heading rate signal is provided to a function generator 205 which comprises a hysteresis function wherein the output of the function generator 205 transitions from low to high, e.g., logic 0 to logic 1, if the heading rate signal rises above a first threshold magnitude (Th1$_{ON}$), and the output of the function generator transitions from high to low, e.g. logic 1 to logic 0, when the heading rate signal falls below a second threshold magnitude (TH1$_{OFF}$), the second threshold being of a lower magnitude than the first threshold. The output of the function generator 205 is provided on a line 208 to an OR gate 210. The heading rate signal is also provided on the line 203 to a differentiator 212, the output of which is a heading acceleration signal on a line 215. The heading acceleration signal is also provided to a function generator 218 having a hysteresis function of the type described with respect to function generator 205, wherein the output of the function generator transitions from low to high when the heading acceleration signal rises above a first threshold magnitude (TH2$_{ON}$), and the output of the function generator transitions from high to low when the heading acceleration signal falls below a second threshold magnitude (TH2$_{OFF}$) The output of the function generator 218 is provided on a line 219 to the OR gate 210.

A roll rate signal, provided for example by a roll rate gyroscope, is provided on a line 222 to a function generator 225 having a hysteresis function the output of which transitions from low to high when the roll rate signal rises above a first threshold magnitude (TH3$_{ON}$), and the output of which transitions from high to low when the roll rate signal falls below a second threshold magnitude (TH3$_{OFF}$). The output of the function generator 225 is provided on a line 228 to the OR gate 210. Similarly, a pitch rate signal, provided for example by a pitch rate gyroscope, is provided on a line 231 to a function generator 235 also having a hysteresis function, the output of which transitions from low to high when the pitch rate signal rises above a first threshold magnitude (TH4$_{ON}$), and the output of which transitions from high to low when the pitch rate signal falls below a second threshold magnitude (TH4$_{OFF}$). The output of the function generator 235 is provided on a line 236 to the OR gate 210. Therefore, if the output of any one of the function generators 205, 218, 225, 235 is high, e.g. logic one, the output of the OR gate will be high.

The output of the OR gate 210 is a turn detect signal on a line 240 which is provided to an OR gate 243. The turn detect signal is also provided to a delay timer 245 which provides an output signal on the line 247 to the OR gate 243 for a fixed period of time in response to a turn detect signal on the line 240 going from high to low. Therefore, upon removal of the turn detect signal on the line 240, the delay time 245 continues to provide a signal to the OR gate 243 for a fixed period. The output of the OR gate 243 is provided on a line 250 to an AND gate 252.

The turn detect signal is also provided to a disabled timer 254. The disabled timer provides an output signal on a line 256 unless a turn detect signal is present on the line 240 for a period which exceeds the disable period. The disable timer output is provided on the line 256 to the AND gate 252.

The output of the AND gate 252 is provided on a line 260 to switching means 262. When the output of the AND gate is low, because either the disable timer has timed out or there is no turn detect signal and the delay timer has timed out, the tracker constants, i.e., $\alpha$ and $\beta$, are set equal to their normal values in step 265 and the tracking system functions normally. However, if the output of the AND gate is high, the value of the tracking system constants are increases, e.g., $\alpha'$ and $\beta'$, to reduce the system time constant, thereby increasing the responsiveness of the tracking system in a step 267. Additionally, the target velocity and track position displayed on the CDU 39 are dead reckoned in a step 268, as described in greater detail with respect to FIGS. 3 and 5.

Referring now to FIGS. 3 and 5, upon the commencement of target dead reckoning, target track and velocity information displayed on the CDU 39 are determined by a dead reckoning portion 300 of the tracking system. The velocity signal V(x,y) is provided on a line 301 to an initial dead reckoning portion 302 of the system wherein the target dead reckoning velocity Vdr(x,y) is set equal to V(x,y). Thereafter, for the duration of target dead reckoning, the targets velocity is a fixed value. Vdr(x,y) is provided on a line 303 to the CDU 39 as an indication of the target velocity. Additionally, Vdr(x,y) is applied to a multiplier 305 which multiplies Vdr(x,y) by the scan rate (dt). The output of the multiplier is a change in dead reckoned position signal dPdr(x,y) which is indicative of the change in target dead reckoned position during the scan rate period dt for a target moving at a velocity equal to Vdr(x,y). dPdr(x,y) is provided on a line 307 to a summing junction 310.

Upon the commencement of target dead reckoning, the smoothed target position STP(x,y) is also provided on a line 312 to an initial dead reckoning position portion 314 of the system as the initial value of the smooth target dead reckoned position STDP$_n$(x,y) on a line 315. STDP$_n$(x,y) is provided to the CDU 39. Additionally, STDP$_n$(x,y) is provided to the summing junction 310 where it is summed with dPdr(x,y). The output of the summing junction 310 is a smooth target dead reckoned position signal STDP$_{n+1}$(x,y) indicative of the dead reckoned target position after the time period dt. Therefore, the dead reckoning portion of the tracking system dead reckons the target track based on the target position and velocity immediately prior to a turn detect signal.

The tracking system, including target dead reckoning during a turn detect, may be embodied in digital integrated circuitry which implements the system described hereinbefore. However, the tracking system may also be of the type employing a known microprocessor (UPROC) for executing an algorithmic subroutine of FIGS. 6a and 6b, as described hereinafter, which implements the turn detect system and dead reckoning systems of FIGS. 3, 4 and 5.

Figure 6A:
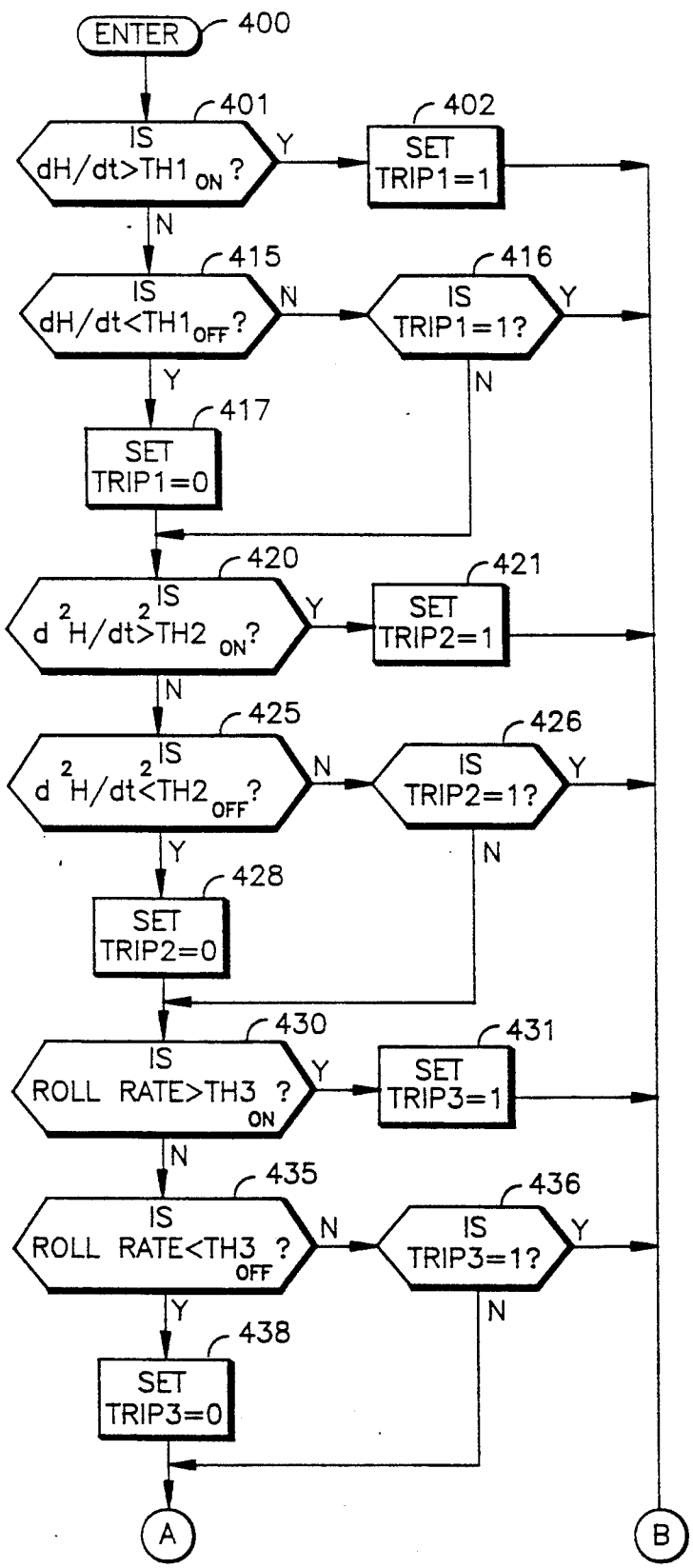
FIGS. 6a and 6b are a simplified logic flow diagram of a routine for providing target dead reckoning according to the invention in a digital tracking system.
Figure 6B:
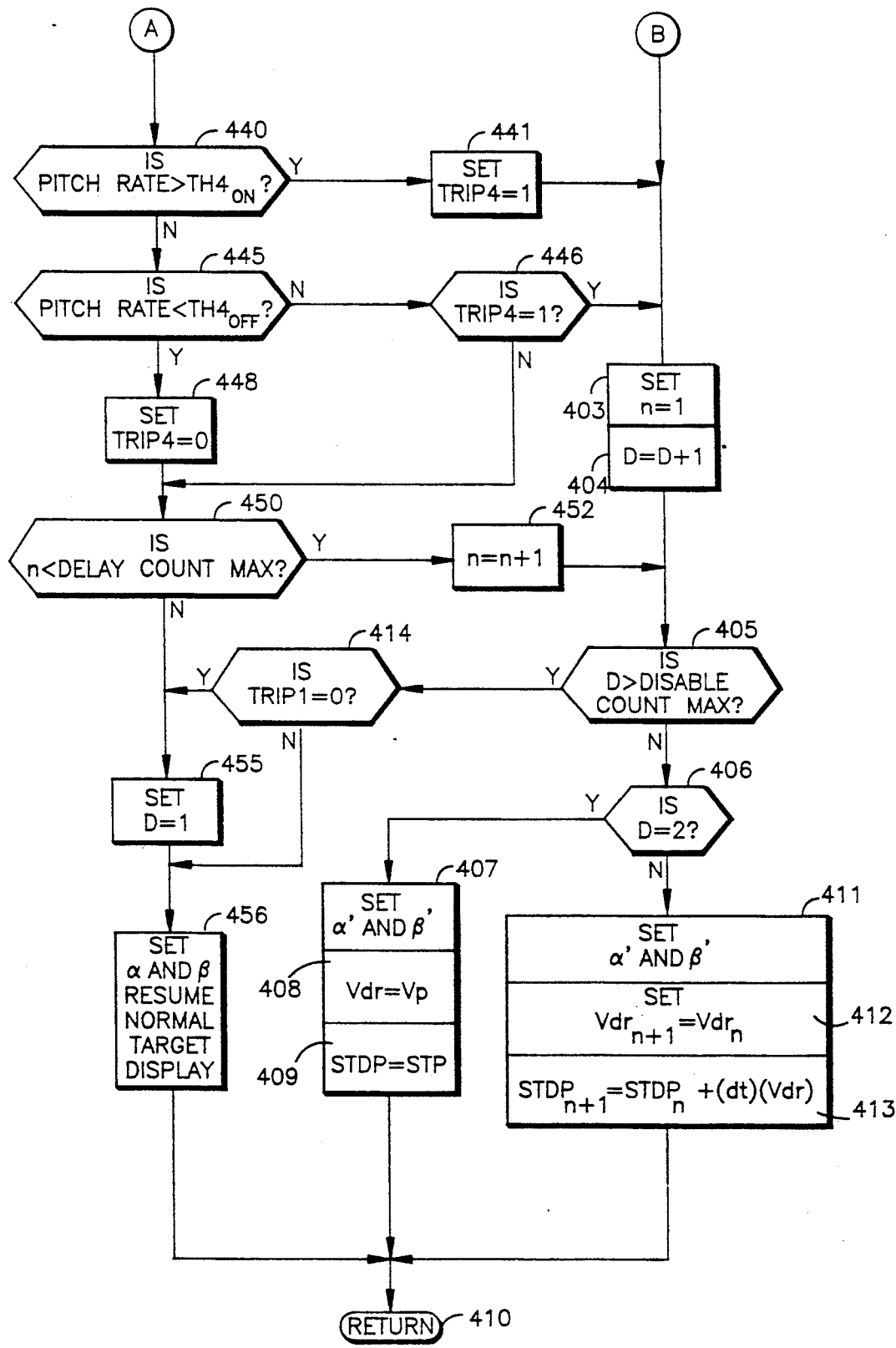

Referring to FIGS. 6a and 6b, upon start-up of the system, system initial conditions are set as follows: the data contained in four data registers, i.e., TRIP1, TRIP2, TRIP3 and TRIP4, are set equal to zero; a delay counter (n) is set equal to its maximum value, e.g., 300, and a disable counter (D) is set equal to 1. The subroutine is entered in a step 400, and then the UPROC checks if heading rate is greater than TH1$_{ON}$ in a test 401. If the results of the test 401 are positive, the heading rate signal is sufficiently high to generate a turn detect signal, and step 402 is performed wherein TRIP1 is set equal to 1. Thereafter, steps 403 and 404 are consecutively performed wherein the delay counter is set equal to 1 and the disable counter is incremented by 1. Next, the UPROC checks if the disable counter is greater than a maximum disable count in a test 405. The maximum disable count corresponds to a time period after which target position dead reckoning is overridden. For example, if the disable time is five minutes in a 200 millisecond machine, the maximum disable count will be equal to 1500. This assures a maximum period of five minutes in which target positioning dead reckoning will continue, and after that time, target tracking will be restored to normal.

If the results of the test 405 are negative, the disable count has not exceeded the maximum disable time, and the UPROC checks if the disable count is equal to 2 in a test 406. If the results of the test 406 are positive, this is the initial receipt of a turn detect signal, and target dead reckoning is initialized in steps 407–409 wherein the target tracker constants are set equal to $\alpha'$ and $\beta'$, target dead reckoned velocity is set equal to the velocity signal, and the smooth target dead reckoned position is set equal to the smoothed target position. The subroutine then returns in a step 410. Thereafter, the results of the test 406 will be negative, and steps 411–413 are consecutively performed wherein the target tracker constants are maintained equal to $\alpha'$ and $\beta'$, target dead reckoned velocity remains constant, and the smooth target dead reckoned position is incremented by the change in dead reckoned position signal dPdr(x,y). The subroutine then returns in the step 410.

If the results of the test 405 are positive, the disable count exceeds the maximum disable count, and the UPROC checks if TRIP1 is equal to zero in a test 414. If the vehicle is in an extended turn, heading rate will remain above $TH1_{ON}$, and TRIP1 will be equal to one. Therefore, in an extended turn, the results of the test 414 will be negative, and the subroutine reaches the step 456 wherein normal tracking is resumed. The subroutine then returns in the step 410. At the completion of an extended turn, TRIP1 is reset to zero as described hereinafter, and the positive results of the test 414 reach a step 455 wherein the disable count is reset to 1. Therefore, once the disable timer reaches its maximum value, it is not reset until the vehicle completes its extended turn, e.g., heading rate falls below $TH1_{OFF}$, and TRIP1 is reset to zero.

If the results of the test 401 are negative, the UPROC checks if the heading rate is less than $TH1_{OFF}$ in a test 415. If the results of the test 415 are negative, then heading rate is between $TH1_{ON}$ and $TH1_{OFF}$, and the UPROC checks if TRIP1 is equal to 1 in a test 416. TRIP1 is initially set equal to zero, and will not be equal to 1 unless heading rate had previously exceeded $TH1_{ON}$. Therefore, if the results of the test 416 are positive, heading rate has generated a turn detect signal, and heading rate has not fallen below the turn off threshold required to remove the turn detect signal. Thereafter, the steps 403 and 404 are consecutively performed, and, if the disable count has not exceeded the maximum disable count in the step 405, the target position is dead reckoned in the steps 411–413. The subroutine then returns in the step 410.

If the results of the test 416 are negative, TRIP1 is equal to zero. Similarly, if the results of the tests 415 are positive, TRIP1 is set equal to zero in a step 417. Next, the UPROC checks if heading acceleration is greater than $TH2_{ON}$ in a test 420. If the results of the test 420 are positive, the heading acceleration signal is sufficiently high to generate a turn detect signal, and TRIP2 is set equal to 1 in a step 421. Thereafter, the UPROC resets the delay counter and increments the disable counter in the steps 403 and 404, and if the disable counter is less than the maximum disable count in the test 405, the target position is dead reckoned in the steps 411–413 if the results of the test 406 are negative, or target position dead reckoning is initialized in the steps 407–409 if the results of the test 406 are positive. The subroutine then returns in the step 410.

If the results of the test 420 are negative, the UPROC checks if heading acceleration is less than $TH2_{OFF}$ in a test 425. If the results of the test 425 are negative, then heading acceleration is between $TH2_{OFF}$ and $TH2_{ON}$, and the UPROC checks if TRIP2 is equal to 1 in the step 426. TRIP2 will be equal to 1 if the heading acceleration previously exceeded $TH2_{ON}$, and if the results of the test 426 are positive, the delay counter is reset and the disable counter is incremented in the steps 403 and 404. Thereafter, if the disable count is less than the maximum disable count in the test 405, the target position is dead reckoned in the steps 411–413. The subroutine then returns in the step 410.

If the results of the test 426 are negative, TRIP2 is equal to zero. Similarly, if the results of the tests 425 are positive, TRIP2 is set equal to zero in a step 428. Next, the UPROC checks if roll rate is greater than $TH3_{ON}$ in a test 430. If the results of the test 430 are positive, the roll rate signal is sufficiently high to generate a turn detect signal, and TRIP3 is set equal to 1 in a step 431. Thereafter, the UPROC resets the delay counter and increments the disable counter in the steps 403 and 404, and if the disable counter is less than the maximum disable count in the test 405, the target position is dead reckoned in the steps 411–413 if the results of the test 406 are negative, or target position dead reckoning is initialized in the steps 407–409 if the results of the test 406 are positive. The subroutine then returns in the step 410.

If the results of the test 430 are negative, the UPROC checks if roll rate is less than $TH3_{OFF}$ in a test 435. If the results of the test 435 are negative, then roll rate is between $TH3_{OFF}$ and $TH3_{ON}$, and the UPROC checks if TRIP3 is equal to 1 in the step 436. TRIP3 will be equal to 1 if the roll rate previously exceeded $TH3_{ON}$, and if the results of the test 436 are positive, the delay counter is reset and the disable counter is incremented in the steps 403 and 404. Thereafter, if the disable count is less than the maximum disable count in the test 405, the target position is dead reckoned in the steps 411–413. The subroutine then returns in the step 410.

If the results of the test 436 are negative, TRIP3 is equal to zero. Similarly, if the results of the tests 435 are positive, TRIP3 is set equal to zero in a step 438. Next, the UPROC checks if pitch rate is greater than $TH4_{ON}$ in a test 440. If the results of the test 440 are positive, the pitch rate signal is sufficiently high to generate a turn detect signal, and TRIP4 is set equal to 1 in a step 441. Thereafter, the UPROC resets the delay counter and increments the disable counter in the steps 403 and 404, and if the disable counter is less than the maximum disable count in the test 405, the target position is dead reckoned in the steps 411–413 if the results of the test 406 are negative, or target position dead reckoning is initialized in the steps 407–409 if the results of the test 406 are positive. The subroutine then returns in the step 410.

If the results of the test 440 are negative, the UPROC checks if pitch rate is less than $TH4_{OFF}$ in a test 445. If the results of the test 445 are negative, then pitch rate is between $TH4_{OFF}$ and $TH4_{ON}$, and the UPROC checks if TRIP4 is equal to 1 in the step 446. TRIP4 will be equal to 1 if the pitch rate previously exceeded $TH4_{ON}$, and if the results of the test 446 are positive, the delay counter is reset and the disable counter is incremented in the steps 403 and 404. Thereafter, if the disable count is less than the maximum disable count in the test 405, the target position is dead reckoned in the steps 411–413. The subroutine then returns in the step 410.

If the results of the test 446 are negative, TRIP4 is equal to zero. Similarly, if the results of the tests 445 are positive, TRIP4 is set equal to zero in a step 448. Next, the UPROC checks it the delay counter is less than the maximum delay count in a test 450. The maximum delay count is selected such that the time it takes for the UPROC to cycle through the subroutine and count up to the maximum delay count is equal to the desired delay period. For example, in a 200 millisecond machine, a maximum delay count of 300 is selected to provide a desired delay period of 60 seconds. Initially, the delay count is set equal to the maximum delay count upon start-up of the system, and is a reset to equal 1 in the step 403 if one of the conditions for a turn detect is met. Therefore, if a turn detect signal was received by the subroutine and then subsequently removed, the delay count will have been reset in the step 403 to equal 1, and the subroutine reaches the test 450, the results of which will be positive reaching a step 452 where the delay count is incremented by 1. Thereafter, the subroutine reaches the step 405, and if the disable count is less than the maximum disable count, the steps 411-413 are consecutively performed wherein the target position is dead reckoned. The subroutine then returns in the step 410. Therefore, after the removal of the turn detect signal, the subroutine will continue to dead reckon the target position for the duration of the delay period. The disable time is not incremented in the step 404 during the duration of the disable period, and the reduced tracking system time constant allows the tracker generated target solution to be rapidly updated after a maneuver during the delay period.

After the delay count equals the maximum delay count, the results of the test 450 are negative, and the steps 455 and 456 are consecutively performed wherein the disable count is reset to 1 and normal tracking is resumed. The subroutine then returns in the step 410. Therefore, if the delay count reaches the maximum delay count, or if the delay count is not reset in the step 403, the tracking system will operate normally and the target position is not dead reckoned.

Although the invention is shown as being an integral part of a radar tracking system, it may be provided as an add-on to an existing radar tracking system to provide target dead reckoning during vehicle heading change or during radar antenna roll and pitch.

Target dead reckoning of the invention may be implemented with a computer program change to the program of a radar tracking system which is implemented digitally by means of a computer, or the invention could be implemented with dedicated digital or analog hardware.

The invention is described as it may be utilized with a radar system having an antenna with a single degree of freedom; however, it may also be utilized with a system having an antenna which is stabilized in three degrees of freedom to provide target dead reckoning during antenna movement beyond the limits of the stabilization system. Although the invention is illustrated as being used with a radar antenna mounted on the under side of an aircraft, the invention will work equally as well on any type of vehicle or platform subject to movement which can be translated directly to a radar antenna.

Although the invention has been illustrated and described with respect to exemplary embodiments thereof, it should be understood by those skilled in the art that the foregoing and various other changes, omission and additions may be made therein and thereto, without departing form the spirit and scope of the present invention.

We claim:

1. A vehicle mounted radar tracking system comprising:
    an antenna
    receiver means connected to said antenna for receiving radar echoes from at least one target and for providing, in responded to said radar echoes, range signals indicative of the range to the respective targets;
    means for providing radar indicated azimuth signals indicative of the pointing direction of said antenna with respect to the vehicle; and
    target tracking signal processing means responsive to said range signals and said azimuth signals for providing target position signals indicative of radar indicated positions of targets being tracked and velocity signals indicative of the velocities of targets being tracked;
    characterized by:
    heading rate means for providing a heading rate signal indicative of vehicle heading rate;
    heading acceleration means for providing a heading acceleration signal indicative of vehicle heading acceleration;
    pitch rate means for providing a pitch rate signal indicative of vehicle pitch rate;
    roll rate means for providing a roll rate signal indicative of vehicle roll rate;
    target position dead reckoning signal processing means responsive to any one of the magnitudes of said heading rate signal, said heading acceleration signal, said pitch rate signal or said roll rate signal being in excess of corresponding enable threshold magnitudes for providing a turn detect signal, and responsive to the magnitudes of said heading rate signal, said heading acceleration signal, said pitch rate signal and said roll rate signal each being less than corresponding disable threshold magnitudes for removing said turn detect signal; and
    said target tracking signal processing means comprising means responsive to said turn detect signal, said position signals and said velocity signals for dead reckoning the positions of targets being tracked, and responsive to the removal of said turn detect signal for discontinuing target position dead reckoning.

2. A vehicle mounted radar tracking system according to claim 1 wherein said target tracking signal processing means further comprises means responsive to said turn detect signal for reducing a time constant of the tracking system, thereby increasing the responsiveness of the tracking system, and responsive to the removal of said turn detect signal for restoring said time constant to its normal value.

3. A vehicle mounted radar tracking system according to claim 2 wherein said target position dead reckoning signal processing means continues to provide said turn detect signal for at least a predetermined time after the magnitudes of said heading rate signal, said heading acceleration signal, said pitch rate signal and said roll rate signal are all less than their corresponding disable threshold magnitudes.

4. A vehicle mounted radar tracking system according to claim 2 wherein said target position dead reckoning signal processing means is responsive to the magnitudes of said heading rate signal, said heading acceleration signal, said pitch rate signal or said roll rate signal being in excess of their corresponding enable threshold magnitudes for providing said turn detect signal for no more than a disable time, and responsive to the lapse of said disable time for removing said turn detect signal.

5. A vehicle mounted radar tracking system according to claim 3 wherein said target position dead reckoning signal processing means is responsive to the magnitudes of said heading rate signal, said heading acceleration signal, said pitch rate signal or said roll rate signal being in excess of their corresponding enable threshold magnitudes for providing said turn detect signal for no more than a disable time, and responsive to the lapse of said disable time for removing said turn detect signal unless said turn detect signal is being provided during said predetermined time.

6. A vehicle mounted radar tracking system comprising:
an antenna
receiver means connected to said antenna for receiving radar echoes from at least one target and for providing, in response to said radar echoes, range signals indicative of the range to the respective targets;
means for providing radar indicated azimuth signals indicative of the pointing direction of said antenna with respect to the vehicle; and
target tracking signal processing means responsive to said range signals and said azimuth signals for providing target position signals indicative of radar indicated positions of targets being tracked and velocity signals indicative of the velocities of targets being tracked;
characterized by:
heading rate means for providing a heading rate signal indicative of vehicle heading rate;
heading acceleration means for providing a heading acceleration signal indicative of vehicle heading acceleration;
pitch rate means for providing a pitch rate signal indicative of vehicle pitch rate;
roll rate means for providing a roll rate signal indicative of vehicle roll rate;
target position dead reckoning signal processing means responsive to said heading rate signal indicating a vehicle heading rate in excess of a first enable threshold magnitude, said heading acceleration signal indicating a vehicle heading acceleration in excess of a second enable threshold magnitude, said pitch rate signal indicating a vehicle pitch rate in excess of a third enable threshold magnitude or said roll rate signal indicating a vehicle roll rate in excess of a forth enable threshold magnitude for providing a turn detect signal, and responsive to said heading rate signal indicating a vehicle heading rate less than a first disable threshold magnitude, said heading acceleration signal indicating a vehicle heading acceleration less than a second disable threshold magnitude, said pitch rate signal indicating a vehicle pitch rate less than a third disable threshold magnitude or said roll rate signal indicating a vehicle roll rate less than a forth disable threshold magnitude for removing said turn detect signal; and said target tracking signal processing means comprising means responsive to said turn detect signal, said position signals and said velocity signals for dead reckoning the positions of targets being tracked, and responsive to the removal of said turn detect signal for discontinuing target position dead reckoning.

7. A vehicle mounted radar tracking system according to claim 6 wherein said target tracking signal processing means further comprises means responsive to said turn detect signal for reducing a time constant of the tracking system, thereby increasing the responsiveness of the tracking system, and responsive to the removal of said turn detect signal for restoring said time constant to its normal value.

8. A vehicle mounted radar tracking system according to claim 6 wherein said tracking system is an $\alpha$-$\beta$ tracking system.

9. A vehicle mounted radar tracking system according to claim 8 wherein said target tracking signal processing means further comprises means responsive to said turn detect signal for increasing the magnitudes of the $\alpha$ and $\beta$ tracking system constants, thereby increasing the responsiveness of the tracking system, and responsive to the removal of said turn detect signal for restoring the $\alpha$ and $\beta$ tracking system constants to their normal values.

10. A vehicle mounted radar tracking system according to claim 9 wherein said target position dead reckoning signal processing means continues to provide said turn detect signal for at least a predetermined time after the magnitudes of said heading rate signal, said heading acceleration signal, said pitch rate signal and said roll rate signal are all less than their corresponding disable threshold magnitudes.

11. A vehicle mounted radar tracking system according to claim 9 wherein said target position dead reckoning signal processing means is responsive to the magnitudes of said heading rate signal, said heading acceleration signal, said pitch rate signal or said roll rate signal being in excess of their corresponding enable threshold magnitudes for providing said turn detect signal for no more than a disable time, and responsive to the lapse of said disable time for removing said turn detect signal.

12. A vehicle mounted radar tracking system according to claim 10 wherein said target position dead reckoning signal processing means is responsive to the magnitudes of said heading rate signal, said heading acceleration signal, said pitch rate signal or said roll rate signal being in excess of their corresponding enable threshold magnitudes for providing said turn detect signal for no more than a disable time, and responsive to the lapse of said disable time for removing said turn detect signal unless said turn detect signal is being provided during said predetermined time.

* * * * *